April 28, 1931.  A. G. CARLSON  1,802,498
ATTACHMENT FOR CULTIVATORS
Filed Aug. 8, 1930  2 Sheets-Sheet 1
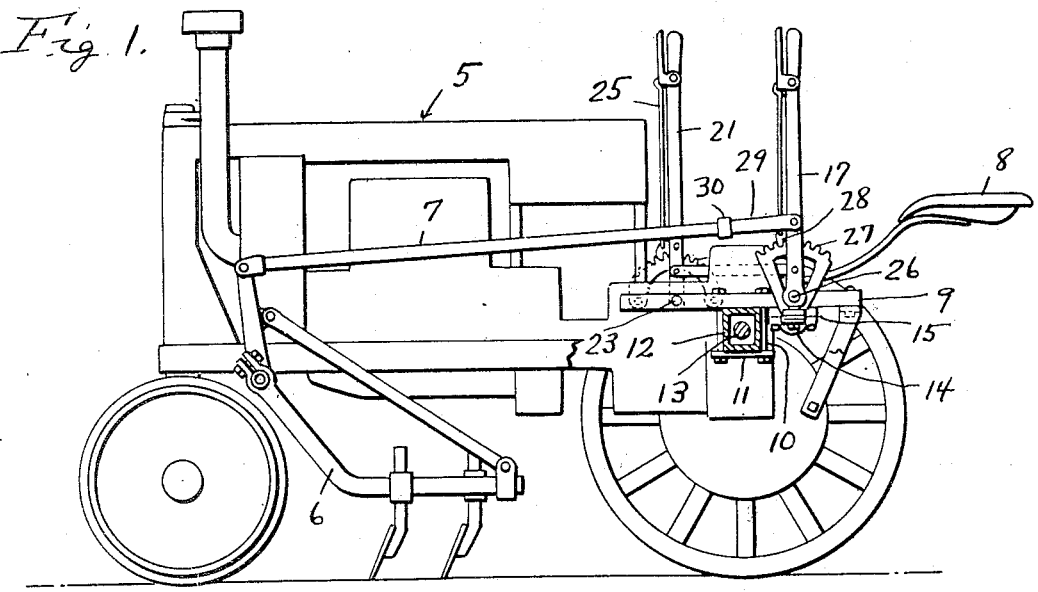
Inventor
Arthur G. Carlson
By Clarence A. O'Brien, Attorney Patented Apr. 28, 1931

1,802,498

UNITED STATES PATENT OFFICE

ARTHUR G. CARLSON, OF ALEXANDRIA, SOUTH DAKOTA

ATTACHMENT FOR CULTIVATORS

Application filed August 8, 1930. Serial No. 473,918.

This invention relates generally to attachments for two-row corn and cotton and other cultivators, and particularly to an attachment whereby the adjustment of the throw of each row engaging tool thereof is maintained while the gang may be simultaneously brought into engagement with the ground.

It is an object of the invention to provide an attachment of the type described which will enable the withdrawal of the gang from engagement with the ground by means of a master lever, and will at the same time provide for adjusting and maintaining an adjustment in each of the members of the gang which have separate levers.

It is also an object of the invention to provide a new and novel arrangement of parts and combination thereof to accomplish this purpose.

It is also an object of this invention to provide an attachment of the character described, which does away with the need of stopping at each end of the field at the end of the row to permit the operation of the throw of the gangs in and then out of engagement with the ground, and provides means whereby it makes possible the throwing of all the gangs in or out of engagement with the ground by means of the master lever in one operation thereof, maintains the adjustment to regulated depths of the separate plows of the cultivator without moving the master lever.

It is also an object of this invention to provide a device of the character described, which results in a considerable saving of labor and reduces the time required for plowing and cultivating.

It is also an object of the invention to provide a device of the character described which is simple and efficient in operation, which is simple and inexpensive to manufacture, and which may be installed on any make of corn or cotton cultivator.

The nature of the invention, its composition and arrangement, and combination of parts will be readily understood by any one acquainted with the art to which this invention relates from a reading of the following description of the drawings in which:—

Figure 1 is a side elevation partly in cross section, disclosing the disposition of my improved attachment upon a cultivator.

Fig. 2 is a top plan view of Fig. 1, showing the line 1—1 in partial section, taken in Fig. 1.

Figure 3:
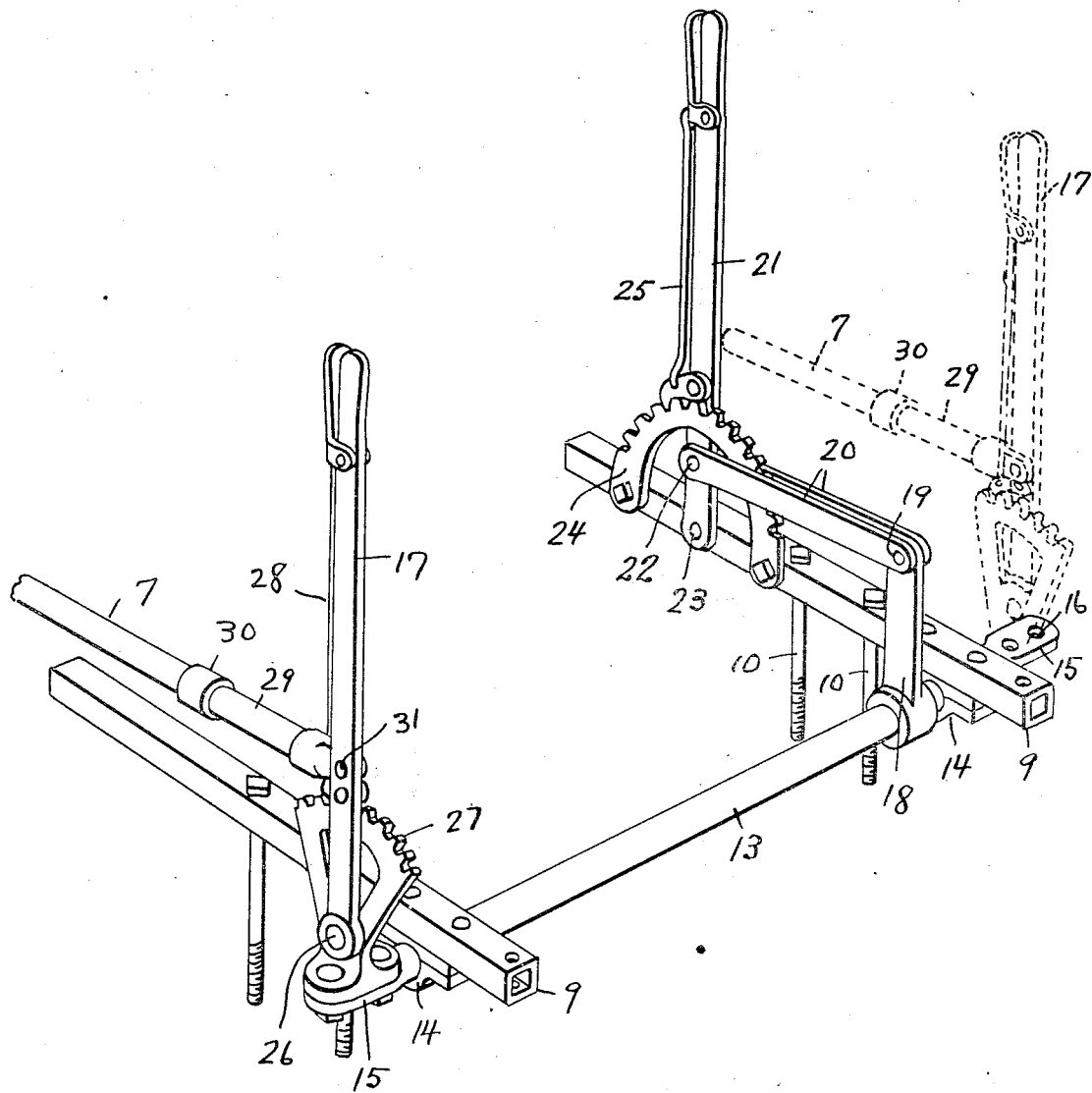
Fig. 3 is a detail perspective of the arrangement of the auxiliary levers and the supports therefor.

It is to be understood that I do not desire to limit the application of this invention to the particular modifications set forth herein, and any change or changes may be made in material and structure consistent with the spirit and scope of the invention.

Referring to the drawings in detail, it will be seen that I designate generally a cultivator tractor by the numeral 5 which is adapted to operate a ground engaging member 6, operated by the connecting rods 7 whose rear ends are actuated from the driver's seat by levers. The connecting rods 7 may be made to operate separate gangs of ground engaging elements. A pair of square hollow tubular bars 9 is provided with bolts for attaching over the axle housing on a tractor, lower ends of the bolts operate to draw a flat plate against the lower side of the axle housing 12 as seen in Fig. 1.

A rotatable steel bar 13 is journaled in boxings or bearings 14, and the extremities of the bar are flattened as at 15 and provided with bolt holes 16. Levers 17 are bolted to said flat extremities 15 on the bar 13. These levers 15, regularly belong with the equipment regularly fastened to the axle housing.

Near one of the square bars 9, the shaft 13 is provided with a lever 18 fixed thereto which carries a pivot 19 at its upper end which pivot provides for connecting a double link of flat plates 20 to a master lever 21 and which extend to and are pivotally connected as at 21 at the point 22. The master lever is pivoted at its lower end as at 23 beside one of the bars 9. A semi-circular ratchet 24 is attached to the inside of the bar 9.

Suitable means 25 is attached to the pawl for securing said lever 21 in adjusted position. It is obvious that the master lever 21 has a connection to the bar 13 and adapted to the same. The lever 17 is pivoted at its lower end as at 26 and provided with a ratchet quadrant 27. Suitable pawl means 28 is provided to retain the lever against displacement for engagement with the ratchet 27.

The connecting rods 7 of the regular equipment are provided with an extension 29 provided with a connecting collar 30 for extending said rods 7 to the proper required length, and the end of the extension structure is pivoted to the lever 17 as at 31.

It will now be obvious that I have provided an attachment for a device of the type described, which is simple, inexpensive to manufacture and install, and which is highly effective to the purpose for which it was designed, enabling the operator of the tractor to eliminate the otherwise required stopping and pulling the individual in and out of the ground by means of each of the levers, and the necessity to then turn, then stop again, and to release the gangs into the ground again, and in this way saves the wear and tear on the machinery, and reduces the labor required to operate the same, and the cost of operating the driving machinery.

Having thus described my invention, what I claim as new is:—

1. An attachment for tractors comprising a pair of bars adapted for attachment to the rear axle of the tractor, means for fixedly mounting the same, a rotatable bar supported transversely of the said bars, and removable means to support said rotatable bar, flattened end portions on the ends of said rotatable bar, and operating lever assemblies mounted on said flattened portions, and a lever connected intermediate said end portions of said rotatable bar and fixed thereto, and pivoted means connecting the upper end of said lever with one of said operating levers, and a master lever mounted on one of said bars.

2. An attachment of the class described for cultivator tractors comprising a pair of bars adapted for disposal upon the rear axle housing of said tractor, means for attaching said bars to the rear axle, a master lever mounted on one end of said bars, a shaft journaled for rotation across the other end of said bars, means for supporting the rotatable shaft, a lever mounted on said shaft, and links connecting the outer end of said lever, with said master lever, and flattened portions on the extremities of said rotatable shaft, and levers mounted on said flat extremities, connecting rods connecting said levers to a cultivator gang adapted to connect said lever to rotate said rotatable shaft, to place or withdraw said gang from ground engaging position.

3. An attachment of the class described for cultivator tractors comprising a pair of bars adapted for disposal upon the rear axle housing of said tractor, means for attaching said bars to the rear axle, a master lever mounted on one end of said bars, a shaft journaled for rotation across the other end of said square bars, means for supporting said rotatable shaft, a lever mounted on said shaft, and links connecting the outer end of said lever with said master lever, and flattened portions on the extremities of said rotatable shaft, and levers mounted on said flat extremities, connecting rods connecting said levers to a cultivator gang and adapted to connect said lever to rotate said rotatable shaft, to place or withdraw said gang from ground engaging position, said levers adapted to be independently adjusted for maintaining said ground engagement at different depths at each side of said cultivator.

In testimony whereof I affix my signature.

ARTHUR G. CARLSON.